United States Patent [19]

Benwell et al.

[11] Patent Number: 5,903,518

[45] Date of Patent: May 11, 1999

[54] MULTIPLE PLASMA CHANNEL HIGH OUTPUT VARIABLE ELECTRO-ACOUSTIC PULSE SOURCE

[75] Inventors: Bruce Benwell, Sumerduck, Va.; Dave DeTroye, Monrovia; Harold E. Boesch, Beltsville, both of Md.; Vincent Ellis, Catlett, Va.

[73] Assignee: The United States of America as represented by the Secretary of the Army, Washington, D.C.

[21] Appl. No.: 09/030,521

[22] Filed: Feb. 23, 1998

[51] Int. Cl.$^6$ .................................................. G01S 15/00
[52] U.S. Cl. .................................................. 367/139; 367/147
[58] Field of Search .................................................. 367/139, 147, 367/137

[56] References Cited

U.S. PATENT DOCUMENTS

| | | | |
|---|---|---|---|
| 3,715,710 | 2/1973 | Bernstein et al. | 367/137 |
| 3,879,698 | 4/1975 | Pepper | 367/137 |
| 4,651,311 | 3/1987 | Owen et al. | 367/147 |
| 4,706,228 | 11/1987 | Owen et al. | 367/147 |
| 4,734,894 | 3/1988 | Cannelli et al. | 367/147 |
| 5,228,011 | 7/1993 | Owen | 367/147 |
| 5,398,217 | 3/1995 | Cannelli et al. | 367/147 |

*Primary Examiner*—Daniel T. Pihulic
*Attorney, Agent, or Firm*—Paul S. Clohan

[57] ABSTRACT

An acoustic impulse source has been developed and used to simulate the high acoustic output of detonation driven acoustic sources. While detonation driven acoustic sources are capable of producing large acoustic signals (>160 dB) at 10s and 100s of meters from the source, their laboratory use is limited due to the combustion byproducts. The present invention is capable of reproducing the downrange detonative source acoustic signals (170 dB) at short range, on the order of 1 meter, without noxious or large thermal byproducts. The present invention relies on the plasma formation resulting from electrical arc discharge in air to generate thermal impulses and the resultant acoustic signals. Utilizing multiple plasma channels and timing control of the formation of said channels, the present invention achieves increased efficiency and the ability to tailor the acoustic output signal to match the desired detonation source characteristic output.

14 Claims, 6 Drawing Sheets

MULTIPLE PLASMA CHANNEL HIGH OUTPUT VARIABLE ELECTRO-ACOUSTIC PULSE SOURCE

FIELD OF THE INVENTION

Currently, different types of acoustic sources are being developed and tested as non-lethal weapons. Among these weapons are a class of detonation driven acoustic sources which are capable of repetitively generating extremely large acoustic impulses to deter people while avoiding lethality. The acoustic output from detonation driven sources are characterized by a sharp risetime, peaked amplitude and fast decay. These detonation sources generate heat, flames, and noxious gas byproducts as a result of the combustion process. In order to assess the weapons being developed, the acoustic signatures must be simulated in the laboratory to avoid the expense of testing at large outdoor ranges. The present invention was developed to provide the laboratory simulation necessary to assess the capability of impulsive acoustic weapons. By varying electrical parameters and the timing of the plasma jet formations, the acoustic output of the present invention can be tailored to reproduce the subject detonation source signature. The present invention also has applications for; gunfire simulators, dog training aids, fowl and rodent control, ceremonial noisemakers, and others.

DESCRIPTION OF RELATED ART

Many devices, which rely upon arc discharge, have been conceived to generate acoustic impulses, with a majority of the prior art concerning underwater uses. The arc discharge Electro-acoustic sources found in the literature can be divided into several categories. U.S. Pat. Nos. 3,715,710 issued to Julius et al., 3,879,698 issued to Pepper, 3,879,699 issued to Pepper, and 5,228,011 issued to Owen, relate to acoustic pulse sources which utilize a combination of electrical pulses to produce a net electrical current. The tailored current is used to drive an acoustic transducer to produce the desired acoustic signal. These patents use a spark gap to create the impulse electrical current, however the spark gaps are located external to the acoustic transducer. The energy dissipated in these spark gaps is lost and cannot contribute to acoustic energy conversion.

U.S. Pat. Nos. 4,651,311 and 4,706,228 both issued to Owen and Schroeder, relate to acoustic pulse sources in which the geometry of the output transducer is used to tailor the output acoustic signal.

U.S. Pat. Nos. 4,734,894 issued to Cannelli et al. and 4,764,906 issued to Clements et al. utilize triggered plasma jet arc discharge to produce acoustic pulses. The referenced patents utilize one plasma jet and rely upon adjustment of electrical parameters (current) to produce variable acoustic output.

U.S. Pat. No. 5,398,217 issued to Cannelli et al. utilizes multiple arc discharge output sections and relies upon adjustment of electrical circuit component values to produce the desired acoustic output.

SUMMARY OF THE INVENTION

The present invention provides a high output acoustic source for simulating the acoustic output of high power detonation driven non-lethal weaponry. The present invention relies on electrical arc discharge to produce intense acoustic pulses. Electric arc discharge is compatible with laboratory testing in that the only hazards (no 'hazmats' are used) besides high voltage is; minimal thermal output, intense light flashing (including UV) and ozone production, which are all easily abated in the lab with standard safety procedures.

The present invention utilizes one or more high voltage (HV) DC power supplies to charge multiple capacitor banks. Each capacitor bank is connected to one side of a spark gap, the other side grounded. Trigger electrodes are disposed in close proximity to the gap of each spark gap. Each trigger electrode is connected via high resistance cable to a coil, of the type used in automotive ignitions. Each coil is charged via a MOSFET switch connected to a 12-volt battery. The opening of the MOSFET switch, subsequent coil magnetic field collapse and trigger arc output is controlled via a fiber optic control cable. The high resistance output cable and fiber optics serve to isolate the HV system from the triggering/timing system. The high voltage produced by the collapsing coil (40,000–60,000 volts) "over-volts" the air gap causing air break down and current flow across the gap, and plasma forms. The high energy contained in the capacitor banks discharges into the plasma stream causing the plasma to continue, create a large thermal impulse and hence acoustic output. By choosing the proper values of capacitance, resistance and inductance of the HV system, the plasma channel time history can be controlled in amplitude and duration. This plasma signal however does not directly map into an identical acoustic output signal.

Because thermal impulses form much slower than the electric arc, the electrical current provided to the plasma channel does not directly translate into an identical acoustic signal. This is further complicated in that air is a nonlinear medium for acoustic impulses. To provide further tailoring of the acoustic output directly, multiple plasma channels are formed at staggered time intervals such that in air the acoustic impulses overlap and add to produce the desired waveshape. That is, the present invention utilizes addition of multiple acoustic output pulses in space. Furthermore, multiple plasma channels increase the net resistance in the gaps (output section) thereby leading to more efficient formation of thermal impulses and hence acoustic output.

The electrodes (2 or more per spark gap) forming the spark gap and the trigger electrodes are fixedly mounted in a tube. One end of the tube is open providing and output face. The opposite end of the tube is closed by a moveable back plate and by adjusting the back plate farther or closer to the open end, the tube length behind the spark gaps can be changed. This allows the timing of the thermal pulse reflection from the back plate to be adjusted and hence provides for further tailoring of the acoustic output.

The output tube is further provided with an air line to allow pressurized air or other gas (such as nitrogen) to be supplied to the interior of the tube during operation. The supplied gas helps abate the production of ozone, provides cooling for the tube, and acts to purge the tube of ionized air and byproducts. Purging of the tube provides for a more consistent output, particularly during repetitive operation.

Accordingly it is an object of the present invention to provide a high output repeatable acoustic signal which is a scaled image of the output from high power detonation driven acoustic weapons.

It is a further object of this invention to provide a variable acoustic waveform through time staggered formations of multiple independent plasma channels.

It is yet another object of the present invention to provide a remotely operated and electromagnetically isolated multiple triggering and timing system to initiate multiple time staggered plasma formations.

It is still another object of this invention to provide an acoustic source with increased efficiency by forming multiple plasma channels in the output section, thereby achieving a net increase in gap resistance, whereby all arc discharges contribute directly to acoustic signal formation.

These and other objects, features, aspects, and advantages of the present invention will become more apparent from the following detailed descriptions when taken in conjunction with the accompanying drawings.

DESCRIPTION OF THE PREFERRED EMBODIMENTS

Figure 1:
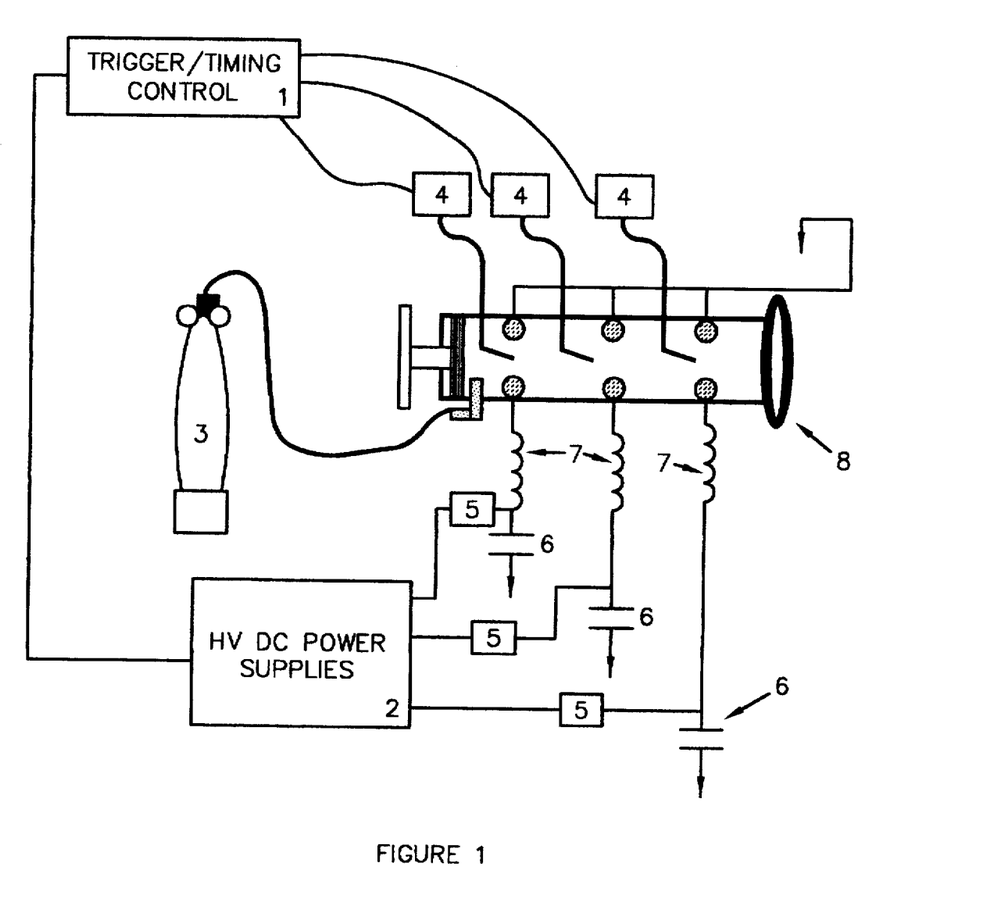
FIG. 1 is an equipment diagram depicting the major components of the present invention.

FIG. 1 depicts the acoustic source tube and supporting controls and supplies. For illustration only, three stages (three plasma channels) are shown. The heart of the present invention lies in the source tube 8. High voltage power supplies 2, supply DC voltage to a charging network, one per stage, consisting of resistors 5 and capacitors 6. Upon electrical arc initiation, the discharge circuit consists of capacitors 6, inductors 7 and any resistance provided by cables, connections and the inductors. Fresh gas 3 is supplied to the tube 8 to provide cooling and to purge the tube of ionized gas and debris. Trigger generators 4 receive trigger signals from the trigger/timing control 1 and generate high voltage impulses to 'over-volt' the spark gaps in tube 8. A signal line connects trigger control 1 and the high voltage supplies 2 and communicates the "full charge" signal from the supplies to the trigger control. The trigger control inhibits triggers until the high voltage supplies indicate a full charge condition.

Figure 2:
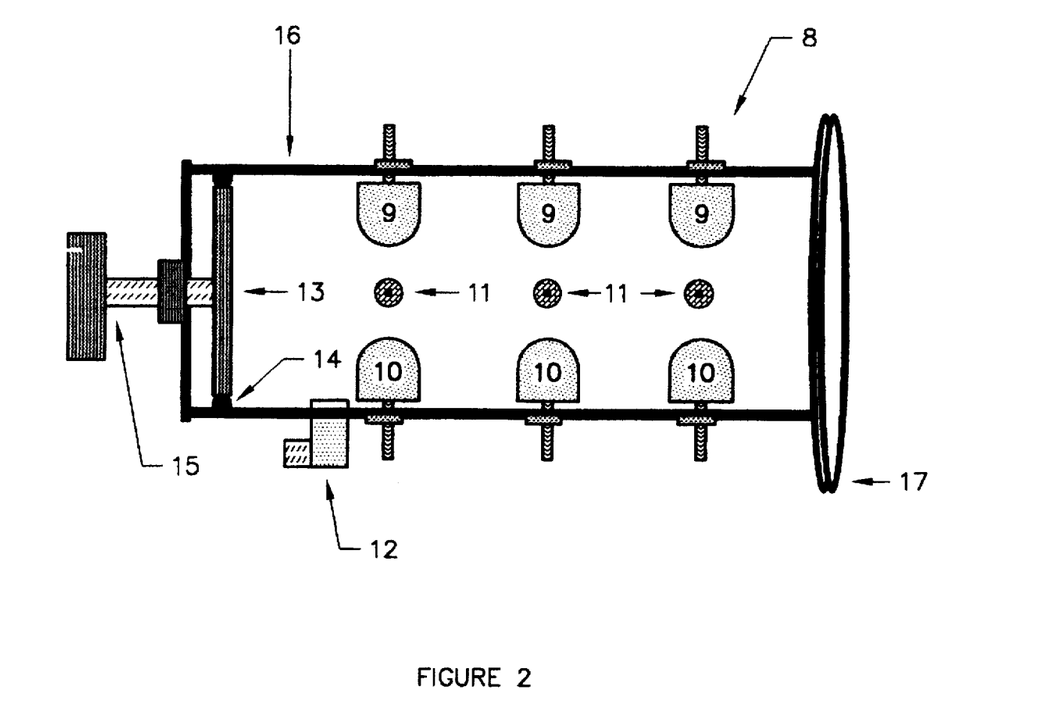
FIG. 2 is a side view schematic depicting the detail of the output tube of the present invention.
Figure 3:
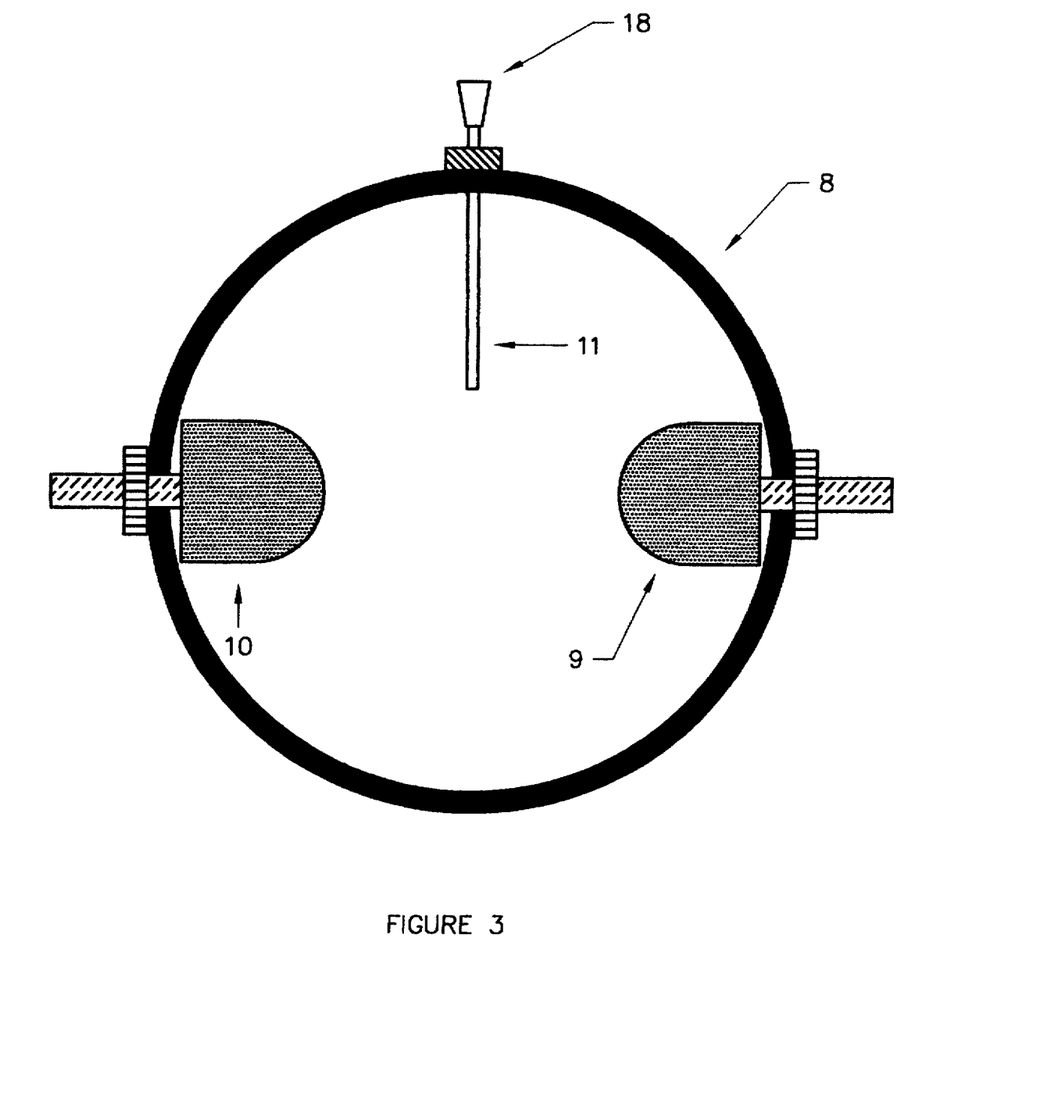
FIG. 3 is a front view schematic depicting the detail of the output tube of the present invention.

Detailed in FIG. 2 is the output tube 8. The tube housing 16 is preferably constructed of ceramic material because of its' thermal stability and electrical isolation. On the open end of the tube is a mounting flange 17 that provides mounting means for a horn or other acoustic antenna. The closed end of the tube contains means for accepting a threaded rod 15, which enables the back plate 13 to be moved within the tube. The back plate is sealed to the inner diameter of the tube via O-ring 14. A fitting 12 is attached to the tube housing allowing gas transport from a gas line to the interior of the tube housing. For illustration, three spark gaps are shown in FIG. 2, each consisting of a positive electrode 9, a negative electrode 10 and a trigger electrode 11. A front view of tube 8 is shown in FIG. 3 and depicts the layout of a spark gap. A connector 18 is provided on the trigger electrode for connection of a high impedance cable.

Figure 4:
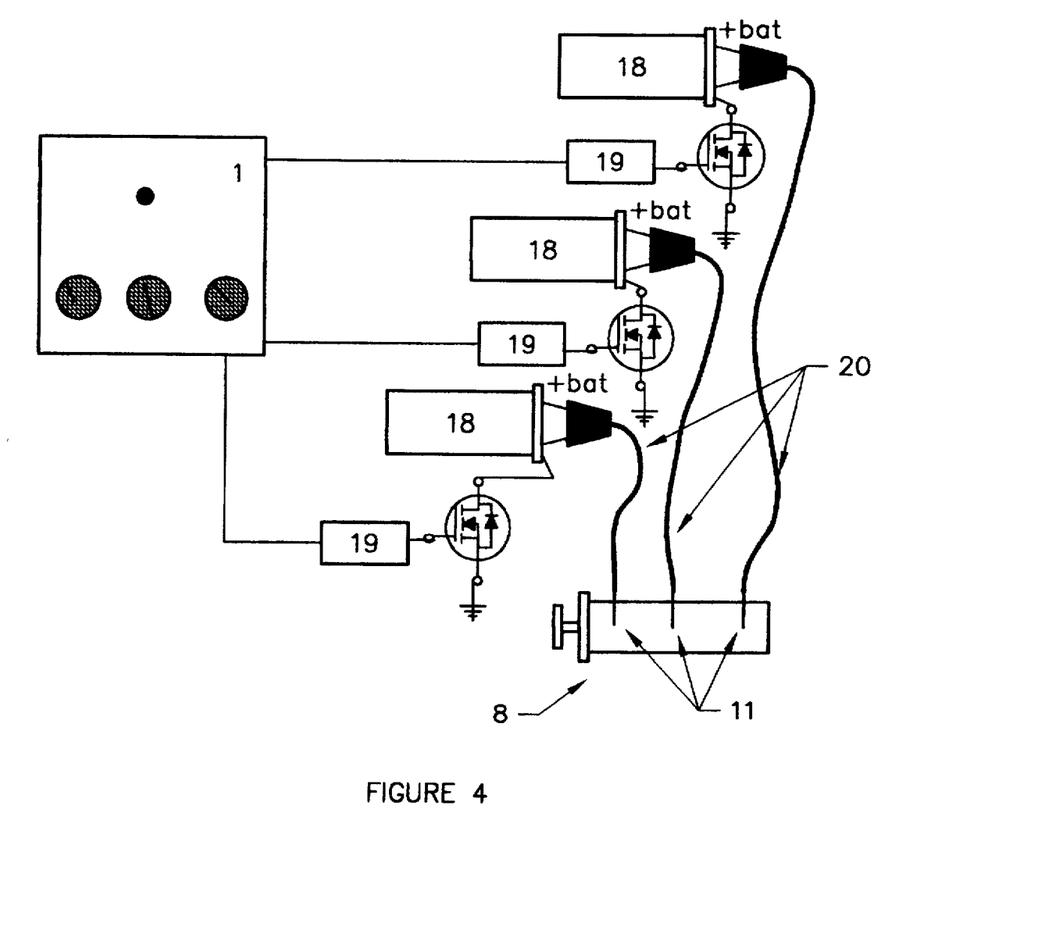
FIG. 4 is a detailed schematic of the triggering/timing system.

FIG. 4 is a detail of the trigger control and timing system. The trigger controller 1 sends a trigger fire signal to each of the spark gap channels. Each trigger fire signal may be individually delayed from the next and is sent via fiber optic signal cable, which isolates the trigger system from the high voltage system and associated electromagnetic noise. Fiber optic receivers 19 receive the fire signal and energize the gate of a MOSFET for predetermined period of time and then release the gate. When on, the MOSFET shorts to ground causing current flow in the primary coil of transformers 18 from a 12 volt battery supply. As the MOSFET turns off, the circuit opens and the magnetic field in the primary of the coil collapses, transferring energy to the coils secondary winding. The high voltage output from the transformers is conducted to each trigger electrode 11, via a high impedance cable 20. The high impedance cables serve to isolate the trigger system from the high-energy discharge in the tube during spark gap break down.

Referring to FIGS. 1–4 in total, a "shot" or series of shots is requested through the trigger/timing control 1, and the power supplies 2 are allowed to charge to their fill charge setting (front panel selectable). The capacitors 6 are charged to the power supply voltage level setting through resistors 5 until full charge is achieved. At full charge, spark gaps electrodes 9 'sit' at the power supply voltage with reference to electrodes 10 (ground). The distance between electrodes 9 and electrodes 10 must be chosen such that the voltage potential between the two will not "self break". Upon receiving a full charge status, the trigger/timing control issues a trigger signal to each of the spark gaps at the appropriate delay time entered for each channel. Each fiber optic receiver 19 receives its trigger signal and energizes the gate of a MOSFET for a predetermined time. The energized MOSFET shorts the primary of transformers 18 to ground allowing current flow through the primary from a 12-volt battery and thereby saturating the transformer's magnetic core. As the receiver releases the gate of the MOSFET, and the circuit opens, the magnetic field in the core collapses causing a amplified (transformed) voltage on the transformer's secondary.

The transformers secondary voltage is supplied to the trigger electrodes 11 situated between the spark gap electrodes. The trigger voltage (40–60 kV) is sufficient to "over volt" the spark gap and an arc occurs between the spark gap electrodes. The arc current forms the plasma and thermal heating of the air causes a pressure expansion. This pressure pulse propagates out of the open end of tube and constitutes the acoustic signal. The arc current continues for a period of time determined by the time constant of the charge capacitance 6, the inductance 7 and the resistance in the plasma channel, and has a damped sinusoidal shape. The acoustic pulse is however, for each plasma channel, a well-defined impulse. After a shot has been fired, another shot may be fired immediately thereafter, limited only by the high voltage DC power supplies' rate of recharge, time constant of the discharge circuit, and the recombination time of ionized air in the tube.

Figure 5:
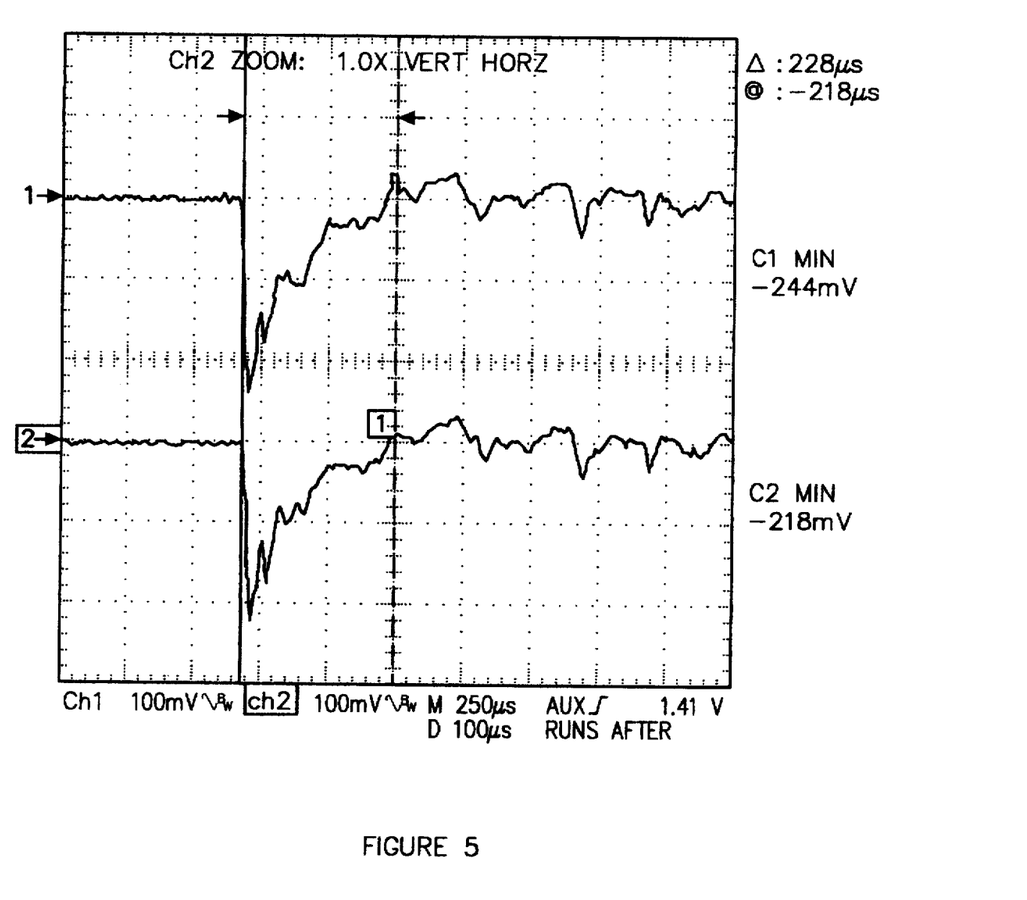
FIG. 5 is a waveform plot comparison depicting the acoustic output generated from one spark gap and the acoustic output resulting from two gaps.

The waveforms in FIG. 5 are the acoustic output measured at 1 meter from the tube output. The microphones used to measure the acoustic signals are inverting, the impulses are actually positive pressure. The data is has not been scaled or corrected for calibration but a direct comparison of the two waveforms is valid. The lower trace (trace 2) is the acoustic output generated from one spark gap using 10 kV power supply charge, 12 uF capacitance and no inductors. The upper trace (trace 1) is the acoustic output resulting from two spark gaps (timed to overlay and add acoustic amplitude), 10 kV supply charge, no inductors and 6 uF capacitance per spark gap. Given the same supply charge and total capacitance, the two gap acoustic signal was approximately 12% higher in amplitude. This efficiency increase is due to the resistance in the second gap doubling the net plasma resistance. The increased resistance causes more energy dissipation (heating) in the plasma zone and yields higher acoustic output.

Figure 6:
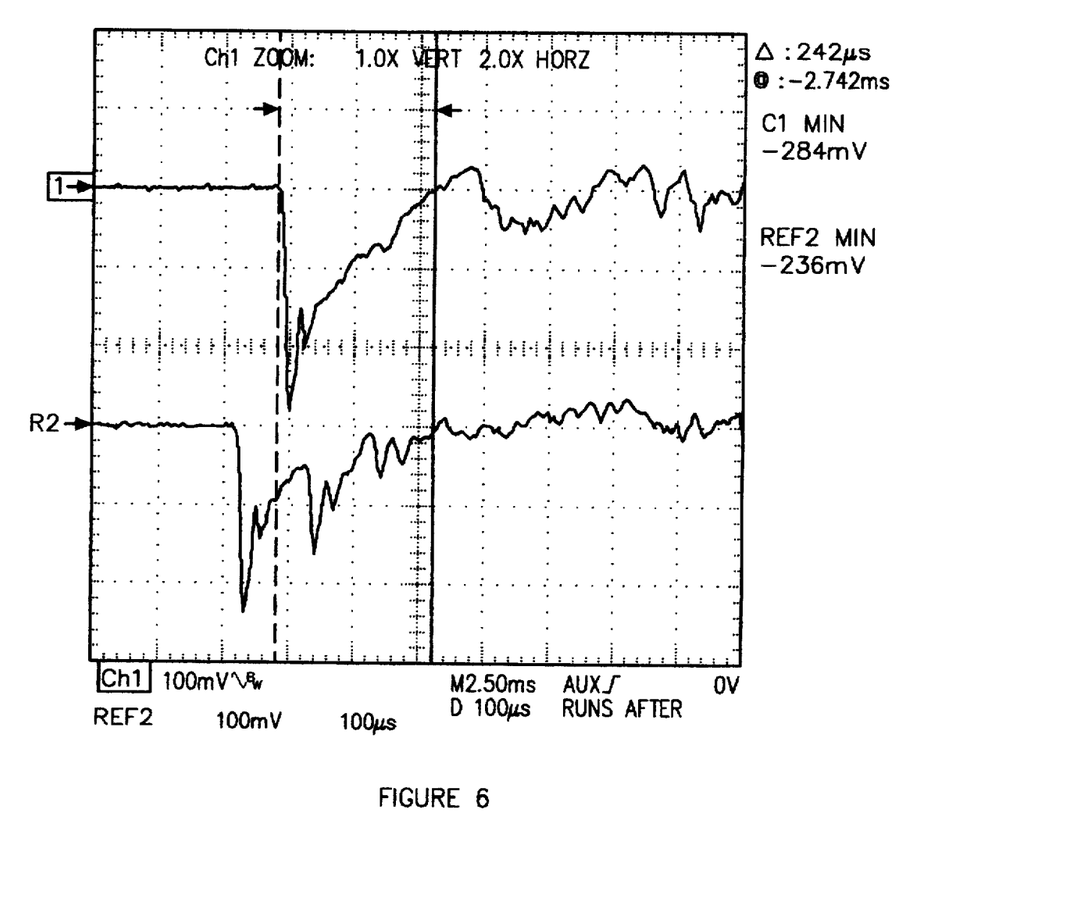
FIG. 6 is a waveform plot comparison depicting the acoustic output from two spark gaps timed to overlay and the acoustic output resulting from three spark gaps with a delayed firing of the third gap.

The waveforms in FIG. 6 are a comparison of acoustic output for a three spark gap excitation. The upper trace (1) shows the acoustic output (raw microphone data) due to three spark gaps, 12 kV supply charge, no inductors, and 4 uF capacitance per each stage. The three gaps in trace 1 were timed to overlay acoustically and create an amplified peak on the impulse. The lower trace (2) shows the acoustic signal resulting from two gaps timed to overlay and the third gap delayed in time. Trace 2 shows the initial peak resulting from two gaps, a second peaked structure approximately 100 usec later. A small third structure is shown and is the result of the third gap reflection from the back plate. Although trace 2 has lower amplitude than trace 1, as expected, the pulse width (zero crossing) on trace 2 is approximately 50 usec greater than that of trace 1. Although the resultant waveform shown in trace 2 is jagged, it is obvious that with more spark gaps and smaller timing delays between each gap, a smooth lengthening of pulse width can be achieved as nulls in the waveform are filled in. By timing some gaps to be coincident at a point in space, the resultant acoustic amplitude may be adjusted, and by timing some of the gaps to be noncoincident at the same point in space, the resultant acoustic signal pulse width may be adjusted. By adjusting the capacitor values, the inductor values, the DC power supply voltage level and the relative timing of all the spark gap discharges; the resultant acoustic signal can be tailored to simulate the desired detonative source acoustic signal.

If the spark gaps are located too close together, the discharge from a preceding gap can ionize the air in the tube and cause succeeding gaps to self-break prematurely. In cases where long time delays are needed the required spacing between the spark gaps may led to an unacceptably long output tube. Additionally, during repetitive use, heating of the tube and electrodes may prove problematic. In these cases, multiple tubes may be used with a single spark gap arrangement. Where a large number of spark gaps are desired for simulation fidelity, multiple tubes with multiple spark gaps per tube are beneficial.

In light of the present disclosure, one skilled in the art can envision numerous uses, benefits, modifications, and embodiments of the present invention. It is therefore to be understood that the present invention may be practiced otherwise than as specifically described herein and not depart from the true spirit and scope of the present invention and the appended claims.

We claim:

1. An apparatus for generating a high power variable acoustic signal comprising:

a source of high voltage electrical power;

an output tube containing one open end and one closed end;

a plurality of metal electrode pairs fixedly mounted in said output tube forming a plurality of spark gaps; wherein, the electrodes of each spark gap electrode pair are mounted radially across said output tube diameter at the same axial location, separated by 180 degrees around said output tube circumference and opposing each other, the first electrode of each electrode pair connected to said source of high voltage electrical power and the second electrode of each electrode pair connected to electrical ground;

means for independently triggering voltage breakdown of each said spark gaps thereby causing electrical arc discharge, wherein said triggering means provides for time delay breakdown of each spark gap relative to all other spark gaps, each spark gap breakdown generating a separate acoustic pulse which combine at said output tube open end to form one acoustic signal.

2. An apparatus for generating a high power variable acoustic signal comprising:

a source of high voltage electrical power;

a plurality of output tubes containing one open end and one closed end;

a pair of metal electrodes fixedly mounted in each said output tube forming a spark gap in each of said plural output tubes; wherein, the electrodes of each spark gap electrode pair are mounted radially across said output tube diameter at the same axial location, separated by 180 degrees around said output tube circumference and opposing each other, the first electrode of each electrode pair connected to said source of high voltage electrical power and the second electrode of each electrode pair connected to electrical ground;

means for independently triggering voltage breakdown of each said spark gaps thereby causing electrical arc discharge, wherein said triggering means provides for time delay breakdown of each spark gap relative to all other spark gaps, each spark gap breakdown generating a separate acoustic pulse which combine at said output tube open end to form one acoustic signal.

3. An apparatus for generating an acoustic signal as recited claim 1 wherein said source of high voltage electrical power further comprises:

at least one high voltage DC power supply;

a plurality of discharge circuits equal in number to the number of said spark gaps, for storing electrical energy from said DC power supply and delivering electrical energy to said spark gaps; each comprising , a resistor and a capacitor both in series with said DC power supply, an inductor connected at one end to the connection node between said resistor and said capacitor and connected to one electrode of one said spark gap electrode pair at the other end.

4. An apparatus for generating an acoustic signal as recited claim 1 wherein said means for independently triggering voltage breakdown of each said spark gaps comprises:

a plurality of metal trigger electrodes equal in number to the number of spark gap electrode pairs and each assigned a spark gap electrode pair and each fixedly mounted in said output tube; wherein, each trigger electrode is mounted on the circumference of said output tube at 90 degrees separation between the electrodes of the assigned spark gap electrode pair, and at the same axial location along said output tube as the spark gap electrode pair to which it is assigned;

a multiple output signal generator for generating a plurality of trigger signals, the number of trigger signals equal to the number of spark gap electrode pairs, wherein each signal generated may be selected to occur at delayed time relative to the all other trigger signals and each trigger signal may be adjusted in pulse width;

means for transforming each of said trigger signals into an independent high voltage excitation of each said trigger electrode;

a plurality of high voltage resistive cables for conducting said high voltage excitations to said plural trigger electrodes;

means for conducting said trigger signals from said signal generator to said transforming means.

5. An apparatus for generating an acoustic signal as recited claim 4 wherein said means for transforming said trigger signals into high voltage excitation of said trigger electrodes comprises:
   a plurality of automotive coils equal in number to the number of spark gaps wherein the secondary of each coil is connected to one of said trigger electrodes by one of said plural high voltage resistive cables and the positive terminal of each coil primary is connected to a DC voltage supply;
   a plurality of MOSFET transistors equal in number to the number of spark gaps, wherein the gate of each MOSFET is connected to one of said trigger signals as an input, the drain of each MOSFET is connected to the negative primary terminal of one of the said plural automotive coils and the source of each MOSFET is connected to electrical ground, such that a received trigger signal will cause the MOSFET to energize the core of said coils for the duration of the trigger signal and upon termination of the trigger signal allow the secondary of said coil to transform the trigger signal to a high voltage output pulse.

6. An apparatus for generating an acoustic signal as recited claim 4 wherein said means for conducting said trigger signals to said transforming means further comprises:
   a plurality of fiber optic transmitters equal in number to the number of said spark gaps for converting electrical trigger signals to light trigger signals;
   a plurality of fiber optic receivers equal in number to the number of said spark gaps for converting light trigger signals to electrical trigger signals to light;
   a plurality of fiber optic cables equal in number to the number of said spark gaps for conducting said trigger signals from said transmitters to said receivers such that conducting the trigger signals from said signal generator to said transforming means is resistant to electromagnetic interference and said signal generator is effectively isolated from high voltage signals.

7. An apparatus for generating an acoustic signal as recited claim 1 wherein said output tube is constructed of ceramic material.

8. An apparatus for generating an acoustic signal as recited claim 1 wherein said output tube closed end further comprises:
   a first circular disc containing and of outer diameter equal to the outer diameter of said output tube and is fixedly attached to one end of said output tube essentially sealing the end, said first disc having a threaded hole in its center;
   a second circular disc moveable within said output tube and of smaller outside diameter than the inner diameter of said output tube, said second disc containing a groove about the edge of its circumference;
   an O-ring fit to the groove of said second circular disc to provide an essentially air tight circumferential seal between said second disc and said output tubes inner wall;
   a threaded rod fixedly attached to the center of said second disc and threaded through said hole in said first disc such that said moveable second disc is rigidly located within said output tube and is moveable axially within said output tube through turning said threaded rod thereby adjusting the relative location of said second disc to said spark gaps.

9. An apparatus for generating an acoustic signal as recited claim 1 further comprising:
   an air line connector disposed within said output tube and passing through said output tube allowing compressed gas to be supplied to the interior of said output tube providing cooling to said output tube and purging of the interior volume of said output tube.

10. A method of simulating the acoustic output of detonative acoustic pulse sources suitable for laboratory use and without production of noxious byproducts, comprising the steps of:
    defining the parameters of the detonative acoustic source signal to be simulated;
    triggering multiple electrical arc discharges independently in a rigid housing containing one open ended output to produce multiple acoustic pulses;
    adjusting the time delay between two or more trigger signals of the said multiple arc discharges such that resultant acoustic pulses are coincident at a point in space and overlay to produce a resultant higher amplitude acoustic signal;
    adjusting the time delay between two or more trigger signals of the said multiple arc discharges such that resultant acoustic pulses are not coincident at a point in space and overlay to produce a resultant wider pulse width acoustic signal;
    adjusting the coincident and noncoincident time delays of said spark gaps repeatedly until said detonative acoustic source signal is simulated.

11. A method of simulating the acoustic output of detonative acoustic pulse sources suitable for laboratory use and without production of noxious byproducts, utilizing a multiple plasma channel variable electro-acoustic pulse source apparatus, said apparatus comprising a DC high voltage power supply, a plurality of discharge networks for storing electrical energy and discharging said stored energy, a plurality of electrical discharge spark gaps each supplied by one said discharge network and located within a rigid housing, means for independently triggering each of said spark gaps, comprising the steps of:
    defining the parameters of the detonative acoustic source signal to be simulated;
    adjusting the range from said electro-acoustic source to the target and adjusting the voltage level of said DC high voltage power supply and adjusting the circuit component values of said discharge networks in an attempt to match the amplitude of the desired acoustic signal at the intended target;
    adjusting the time delay of two or more said spark gap discharges such that the resultant acoustic pulses from each of said spark gaps overlay simultaneously in space to produce a higher amplitude if desired;
    adjusting the time delay of said triggering means for each of the remaining said spark gap discharges such that the resultant acoustic pulses are delayed in space from one another and combine to produce a longer pulse;
    adding additional spark gaps to enable increased amplitude and increased pulse width of the resultant acoustic signal.

12. An apparatus for generating an acoustic signal as recited claim I wherein said source of high voltage electrical power further comprises:
    at least one high voltage DC power supply;
    a plurality of discharge circuits equal in number to the number of said spark gaps, for storing electrical energy from said DC power supply and delivering electrical energy to said spark gaps; each comprising , a resistor and a capacitor both in series with said DC power supply, an inductor connected at one end to the connection node between said resistor and said capacitor and connected to one electrode of one said spark gap electrode pair at the other end.

13. An apparatus for generating an acoustic signal as recited claim 2 wherein said means for independently triggering voltage breakdown of each said spark gaps comprises:

a plurality of metal trigger electrodes equal in number to the number of spark gap electrode pairs and each assigned a spark gap electrode pair and each fixedly mounted in said output tube; wherein, each trigger electrode is mounted on the circumference of said output tube at 90 degrees separation between the electrodes of the assigned spark gap electrode pair, and at the same axial location along said output tube as the spark gap electrode pair to which it is assigned;

a multiple output signal generator for generating a plurality of trigger signals, the number of trigger signals equal to the number of spark gap electrode pairs, wherein each signal generated may be selected to occur at delayed time relative to the all other trigger signals and each trigger signal may be adjusted in pulse width;

means for transforming each of said trigger signals into an independent high voltage excitation of each said trigger electrode;

a plurality of high voltage resistive cables for conducting said high voltage excitations to said plural trigger electrodes;

means for conducting said trigger signals from said signal generator to said transforming means.

14. An apparatus for generating an acoustic signal as recited claim 2 wherein said source of high voltage electrical power further comprises:

at least one high voltage DC power supply;

a plurality of discharge circuits equal in number to the number of said spark gaps, for storing electrical energy from said DC power supply and delivering electrical energy to said spark gaps; each comprising , a resistor and a capacitor both in series with said DC power supply, an inductor connected at one end to the connection node between said resistor and said capacitor and connected to one electrode of one said spark gap electrode pair at the other end.

* * * * *